Figure 8:
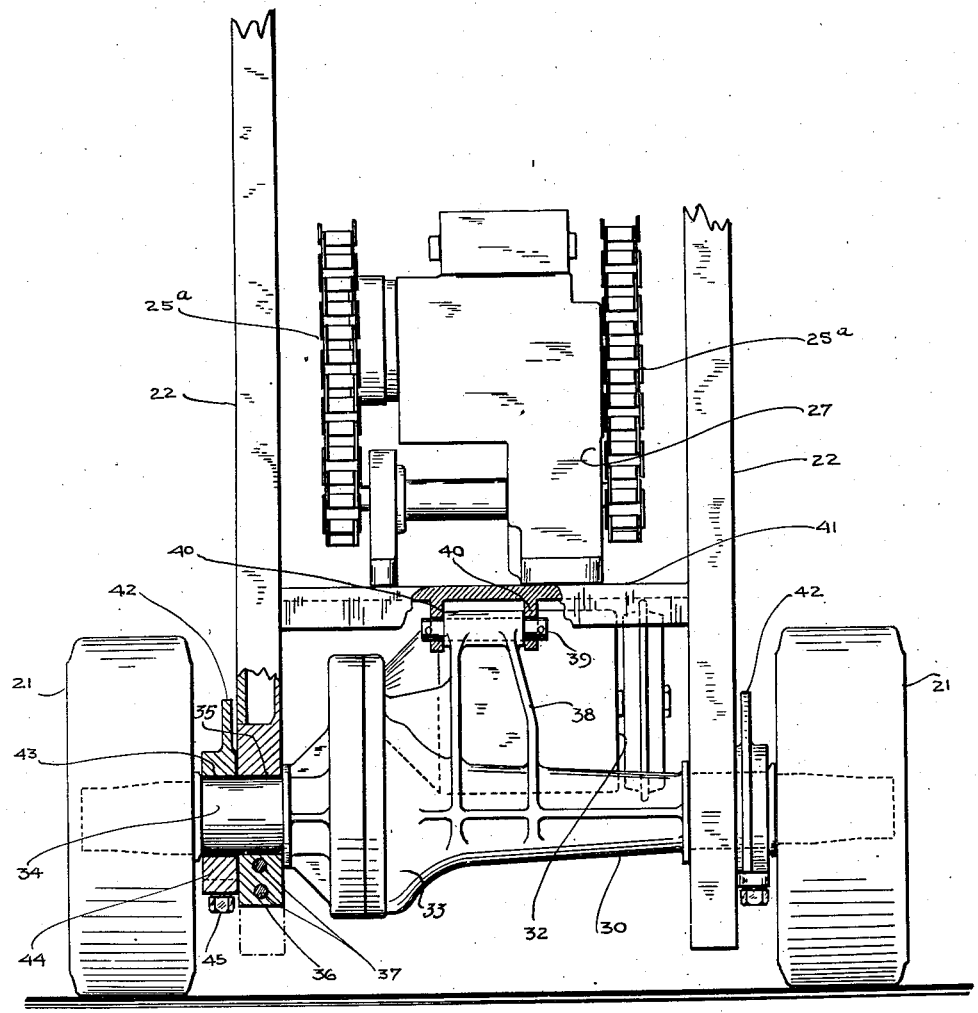

Oct. 1, 1940.    F. A. VOSSENBERG    2,216,697
INDUSTRIAL TRUCK
Filed Dec. 18, 1937    3 Sheets-Sheet 1
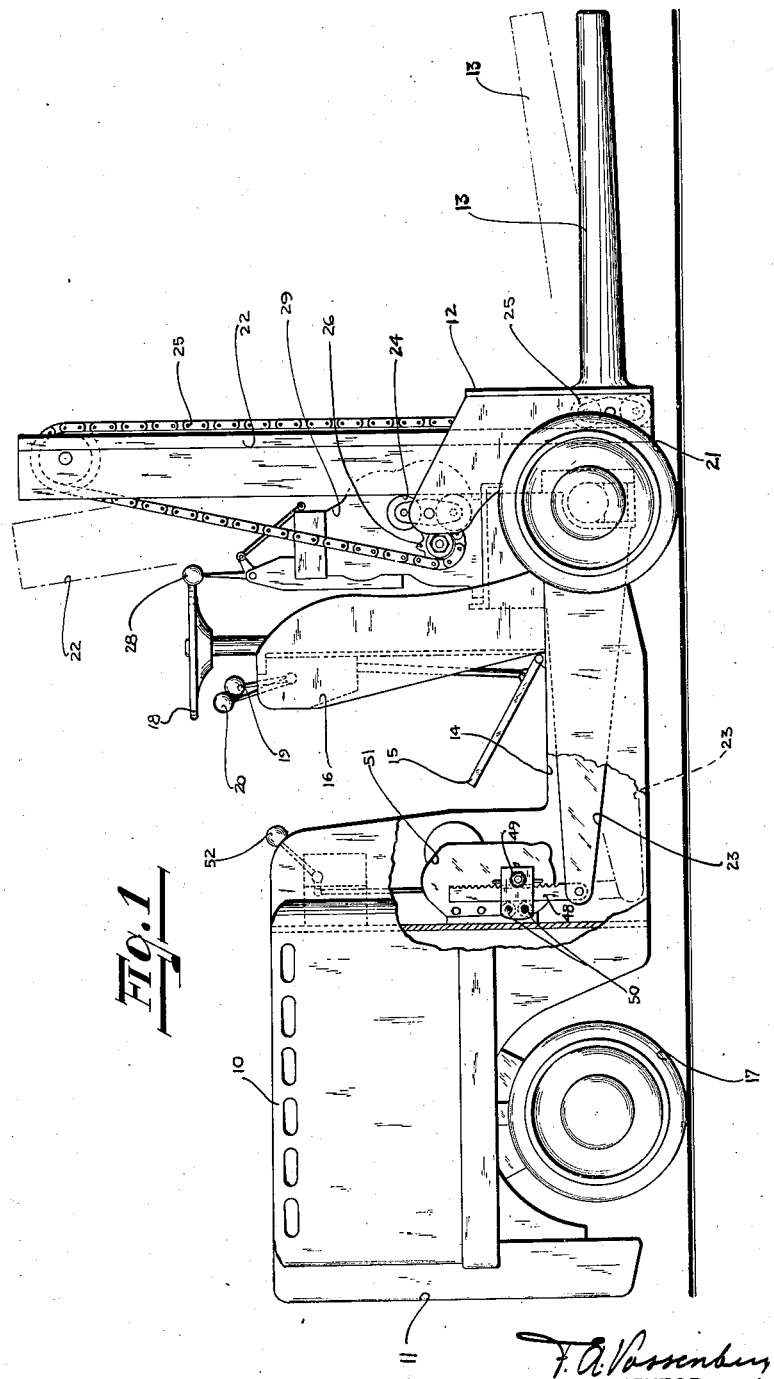
F. A. Vossenberg
INVENTOR
BY A. H. Golden
ATTORNEY

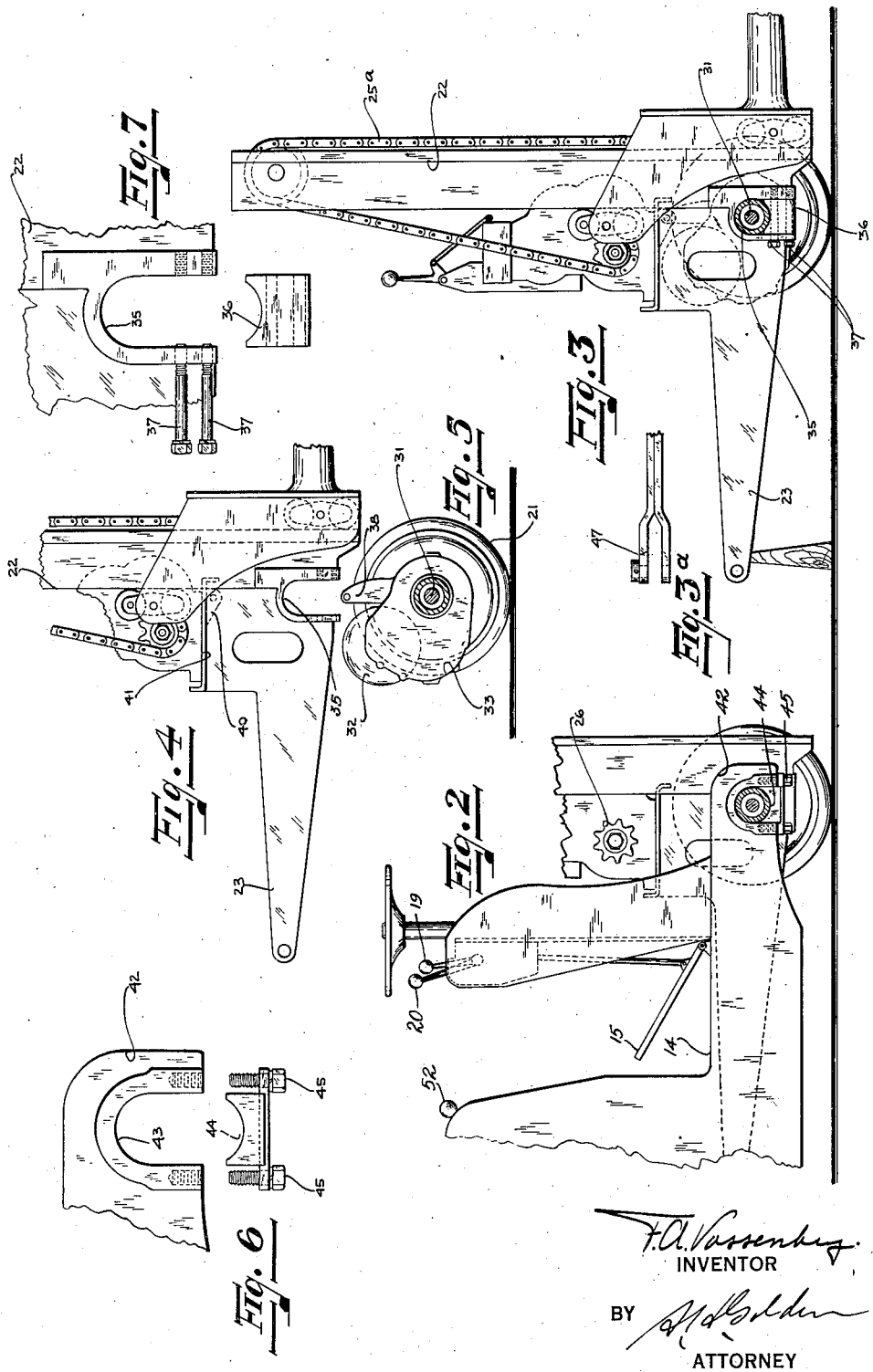

Patented Oct. 1, 1940

2,216,697

UNITED STATES PATENT OFFICE 2,216,697

INDUSTRIAL TRUCK

Frank A. Vossenberg, Philadelphia, Pa., assignor to The Yale & Towne Manufacturing Company, Stamford, Conn., a corporation of Connecticut Application December 18, 1937, Serial No. 180,605

28 Claims. (Cl. 214—113)

My invention relates to an industrial truck. More especially, my invention relates to an industrial truck of the type which is driven by an electric motor, and is adapted for operation in industrial plants.

Because of the increased use of electric industrial trucks in industry, there has gradually been developed a truck which is adapted to pick up and tilt a heavy load, lift that load, and then transport the load to a new location. Thereafter, the truck will lower the load, and tilt the load so that it may be deposited at the new location.

Industrial trucks must be able not only to move extremely heavy loads, but must be of a character to allow of easy manipulation in narrow corridors such as are generally found in industrial plants. Those skilled in the art will readily appreciate the considerable problem which must be solved in mounting on a single truck, units for lifting a load, tilting a load, and transporting it, while at the same time so assembling the units that the truck will be of a very short wheel base, and may be handled with ease.

My truck is capable of tilting and lifting a heavy load, and of transporting that load to a desired location. In my truck, the various power units are mounted for efficient operation, easy assembly, and economy of space. I have also so arranged my truck that the operator will be placed in a position where he may readily observe the operation of the truck, and may readily guide the truck through the narrow aisles in which he must operate in the average industrial plant.

More in detail, my truck has a low medial portion which serves as the operator's platform. At the forward end, the main frame of the truck is supported by a novel traction unit comprising a motor, an axle housing, and traction wheels. This same traction unit through its axle housing supports also the tilting uprights of the truck on which is mounted a vertically moving carriage. The tilting uprights carry the motor, which is adapted to move the vertically moving carriage on the uprights.

I provide extremely novel means for tilting the uprights, preferably about the axis of the traction unit axle housing. The means for tilting the uprights is a power unit mounted rearwardly of the medial platform portion. Through suitable means of connection with the tilting uprights, which means of connection in my truck take the preferred form of horizontally extending arms moving with the tilting uprights, the rearwardly mounted power unit tilts the uprights. More in detail, the horizontal arms of the tilting uprights are movable below the operator's platform and carry pivotally connected rack bars which are actuated by pinions forming part of the tilting power unit.

As a further feature of my invention, I arrange to accept the torque of the traction unit through an extending arm which is secured to the tilting upright assembly. The torque thus transmitted to the tilting upright assembly is in turn accepted by the racks connected to the horizontally extending arms of the tilting fork assembly, and therefore by the power unit pinions. Because of the considerable leverage aiding the tilting power unit, it readily accepts this torque, as will be appreciated by those skilled in the art.

I have described the general construction of my invention and the reasons for this construction, in order that the detailed description which follows may be more readily understood.

For a detailed description of my invention, I shall refer to the drawings wherein Fig. 1 is a side elevation of the truck of my invention with certain parts broken away to clarify the construction thereof. Fig. 2 is a view of certain parts of Fig. 1 with one side wheel of my traction unit removed, and with the axle housing in section to illustrate the connection between the main frame and the traction unit. Fig. 3 shows the construction of the L shaped tilting assembly and the method of securing this assembly to the traction unit. Fig. 3a is a view looking down on that part of Fig. 3 immediately below Fig. 3a. Fig. 4 is a view of the L shaped tilting assembly prior to its assembly to the traction unit, as shown in Fig. 3. Fig. 5 shows the traction unit just below the tilting unit of Fig. 4, and ready to be assembled thereto to form the construction shown in Fig. 3. Fig. 6 is an exploded view of the bearing assembly for securing the traction unit to the main frame. Fig. 7 is an exploded view of the bearing assembly for securing the tilting uprights to the traction unit. Fig. 8 is a partial elevation and partial section showing the assembly of the traction unit to the L shaped tilting unit and to the main frame.

Referring now more particularly to the drawings, my truck has a rearward battery containing compartment 10 carrying the usual battery, which is not shown, and counter-weighted as at 11 for balancing a load which may be placed on the vertically moving load carriage 12, which in this case supports a ram 13, but which may support a series of forks or a platform, as may be desired. It is well to indicate that my truck may in some cases use a gas-electric unit as a source of motive power. The main frame extends downwardly to form an operator's platform 14, to which is pivoted a usual type of control pedal 15 for controlling a traction controller 16 in a manner well known by those skilled in the art.

Steering wheels 17 are mounted directly under the battery compartment 10, and are steered by a steering wheel 18 readily accessible to an operator standing on the operator's platform 14. A pair of controller levers 19 and 20 are also readily accessible to an operator standing on the platform 14, and are used through controller 16 for controlling the traction motor to be described presently.

The driving or traction wheels are designated by reference numeral 21, and are mounted at that end of the truck which in the industry is known as the forward end. At this same forward end, there is mounted a tilting upright assembly having vertical uprights 22, and horizontally extending arms 23. The vertically moving carriage 12 is equipped at each side with roller assemblies 24 and 25 whereby it may move vertically on the uprights 22 when actuated by the elevating chains 25a, which are operated through pinions 26 by a lifting power unit 27 secured to the uprights 22 for movement integrally therewith. The power unit 27 is controlled by a suitable electrical controller which is operated by the lever 28, also readily accessible to an operator standing on the medial depressed operator's platform 14.

Referring now to Figs. 5 and 8, the traction unit of my truck comprises a pair of wheels 21, already described, which are supported on the opposite ends of an axle housing 30, and are driven in the usual manner by connection with a drive shaft 31, shown in Figs. 2, 3 and 5.

The traction unit comprises also a traction motor 32, which through suitable gearing drives the shaft 31, this gearing all being incorporated in the gear housing 33 of the traction unit. The axle housing 30 has formed at each of its opposite ends bearing surfaces 34, and on these bearing surfaces are supported the main frame and also the L shaped tilting unit comprising the uprights 22 and the horizontally extending arms 23. As is probably best shown in Figs. 4 and 7, the tilting upright unit has formed thereon a substantially semi-circular bearing portion 35 with which co-operates a removable bearing portion 36 adapted to be united relatively to the bearing portion 35 by means of bolts 37, as is best shown in Figs. 3 and 8.

Those skilled in the art will readily appreciate that some means must be provided for accepting the traction torque which will be developed between the traction unit and the tilting upright assembly through the mounting of the tilting upright assembly on the bearing surface 34 of the axle housing. I have extending from my traction unit an arm 38, best shown in Figs. 5 and 8, which through a hardened pin 39 secures the traction unit to depending lugs 40 formed on a cross bar 41 uniting the two vertical uprights 22 of my tilting unit assembly. It will be readily appreciated that because of this construction, it is quite easy to assemble the tilting upright unit to the traction unit.

I shall now describe the method of assembling the main frame of the truck to the traction unit and to the tilting uprights, this being probably best illustrated with reference to Figs. 2, 6, and 8. The main frame of the truck has two horizontally extending main side bars 42, the forward ends of which are best shown in Figs. 2 and 6. On each bar 42 there is a bearing portion 43 cooperating with a removable bearing portion 44 whereby the main frame may be assembled relatively to the bearing surfaces 34 of the axle housing 30. Through stud bolts 45 and a plate 46, each of the side bars 42 is readily assembled to the axle housing, as shown in Fig. 8.

With the parts assembled as just described, the horizontally extending arms 23 of the tilting unit are now located under the depressed platform 14 of the truck. Each horizontally extending arm of the tilting unit is forked as at 47 in Fig. 3a, whereby to be secured to a vertical rack 48 which in turn is adapted to be actuated by a pinion 49, a pair of rollers 50 being provided to guide each rack in its vertical movement in contact with the pinions 49. The pinions 49 are part of a power unit 51, suitably controlled by a controller lever 52 readily accessible to an operator standing on the platform 14.

It will be readily appreciated that rotation of the pinions 49 by the power unit 51 under the control of lever 52 will move the racks 48 so as to move the horizontally extending side arms 23 of the tilting unit, as from the full line position of Fig. 1 to the dotted line position shown in Fig. 1. This movement will of course move the tilting uprights 22 from their full line position of Fig. 1 to their dotted line position in that figure, and will also move the ram 13 from its full line position to its dotted line position.

The operation of my invention is now probably quite clearly understood, it is thought, but it may nevertheless be helpful to describe one complete operation of the truck. The operator stands on the platform 14 and steers the truck through means of steering wheel 18. Through operation of the tilting unit 51, he moves the ram 13 into any desired tilted position, as into its dotted line position of Fig. 1, this being used as a means for tilting a load which is accepted by the ram 13. If now it be desired to lift the load as by lifting the ram 13 and the carriage 12, it is only necessary to operate the lifting unit 27 through operating lever 28, the rotation of the pinions 26 causing chains 25a to elevate the carriage 12. If it is now desired to move the load to any particular new location, it is only necessary to operate the traction motor 32 suitably controlled by levers 19 and 20. Thereafter, to deposit the load, it is only necessary to lower the carriage 12 and tilt the ram 13 in a direction reverse to that previously described.

The ease with which my truck is assembled, its compactness, the ready accessibility of the several power units, and its easy control from the operator's platform, will of course appeal to those skilled in the art, and are of basic importance.

I now claim:

1. In a truck of the class described, a main frame having a medial portion in the form of a depressed operator's platform, a pair of vertical uprights mounted at the end of the truck forward of said medial portion for tilting movement relatively to said main frame, a power unit mounted on said main frame rearwardly of said medial portion, and means of connection extending below said platform between said power unit and uprights for tilting the said uprights and out of obstructing relation to said depressed platform.

2. In a truck of the class described, a main frame having a medial portion in the form of an operator's platform, a pair of vertical uprights mounted at the end of the truck forward of said medial portion for tilting movement relatively to said main frame, a power unit mounted on said main frame rearwardly of said medial portion, and pivoting lever arms extending from said vertical uprights beneath said medial platform portion to said power unit whereby operation of said power unit tilts said uprights.

3. In a truck of the class described, a main frame having a medial portion in the form of an operator's platform, a pair of vertical uprights mounted at the forward end of said main frame for tilting relatively to said main frame, horizontal extensions secured to said uprights and extending longitudinally to the rear of the truck and below said operator's platform, a power unit carried by said main frame rearwardly of said operator's platform, and means secured to said horizontal extensions of the vertical uprights and operated by said power unit for tilting said uprights relatively to said main frame.

4. In a truck of the class described, a main frame having a medial portion in the form of an operator's platform, a pair of vertical uprights mounted at the forward end of said truck for tilting movement relatively to said main frame, horizontal extensions secured to said uprights and extending longitudinally of said truck in non-obstructing relation to said platform and to the rear of the truck and beyond said medial portion, a power unit carried by said main frame, and means secured to said horizontal extensions of the vertical uprights operated by said power unit for tilting said uprights relatively to said main frame.

5. In a truck of the class described, a main frame having a medial portion in the form of an operator's platform, a pair of vertical uprights mounted at the forward end of said main frame for tilting relatively to said main frame, horizontal lever like extensions secured to said uprights and extending longitudinally of the truck and below said operator's platform, a power unit carried by said main frame, and means secured to said horizontal lever like extensions of the vertical uprights operated by said main frame power unit for tilting said uprights relatively to said main frame.

6. In a truck of the class described, a main frame having a depressed medial portion in the form of an operator's platform, a pair of vertical uprights mounted at the forward end of said truck for tilting movement relatively to said main frame, horizontal extensions secured to said uprights and extending longitudinally of said truck and to the rear of the truck and beyond said medial portion, an elevating platform mounted on said uprights, a power lift unit for said platform carried by and movable with said uprights, a power unit carried by said main frame, and means secured to said horizontal extensions of the vertical uprights operated by said main frame power unit for tilting said uprights relatively to said main frame.

7. In a truck of the class described, a main frame having a medial portion in the form of an operator's platform, a pair of vertical uprights mounted at the forward end of said truck for tilting movement relatively to said main frame, horizontal extensions secured to said uprights and extending longitudinally of said truck and to the rear of the truck and beyond said medial portion, a power unit mounted on said main frame at the end thereof to the rear of said medial portion, a pair of vertical racks extending upwardly from said horizontal extensions of the vertical uprights, and pinions driven by said power unit for operating said racks to tilt the said uprights.

8. In a truck of the class described, a main frame having a medial portion in the form of an operator's platform, a pair of vertical uprights mounted at that end of the truck forward of said medial portion for tilting movement relatively to said main frame, horizontal extensions formed on said uprights and extending longitudinally of the truck and below said medial portion to that end of the truck rearward of said medial portion, and means secured to said horizontal extensions of the vertical uprights for tilting said uprights relatively to said main frame.

9. In a truck of the class described, a main frame having a depressed medial portion in the form of an operator's platform, a pair of vertical uprights mounted at the forward end of said truck for tilting movement relatively to said main frame, a battery carrying compartment and power unit at the rear of said truck, and means extending beneath said depressed medial platform portion connecting said power unit to said tilting uprights whereby said power unit tilts said uprights.

10. In a truck of the class described, a main frame having a depressed medial portion in the form of an operator's platform, a pair of vertical uprights mounted at the forward end of said truck for tilting movement relatively to said main frame, a power unit at the rear of said truck, and pivoting lever arms extending beneath said depressed medial platform portion and connecting said power unit to said tilting uprights whereby said power unit tilts said uprights.

11. In a truck of the class described, a main frame having a depressed medial portion in the form of an operator's platform, a pair of L shaped members having vertical portions which form uprights for the mounting of a vertically moving platform, means supporting said L shaped members at one end of said main frame for pivoting on an axis passing substantially through the lower ends of said vertical portions, the horizontal portions of the L shaped members extending rearwardly of the truck main frame below said operator's platform, and means for tilting said L shaped members through actuation of the said rearwardly extending horizontal portions.

12. In a truck of the class described, a main frame having a medial portion in the form of an operator's platform, a pair of vertical uprights mounted at the end of the truck forward of said medial portion for tilting movement relatively to said main frame, a power unit mounted on said main frame rearwardly of said medial portion, means extending from said vertical uprights at the side of said medial platform portion to said power unit whereby operation of said power unit tilts said uprights, a second power unit carried by said tilting uprights for elevating a platform mounted on said uprights, and a controller for each of said power units located for operation by an operator standing on the said medial platform portion.

13. In a truck of the class described, a main frame, a combined power and traction unit having an axle housing and traction wheels, bearing portions on said main frame whereby said main frame is supported on opposite ends of said axle housing, a pair of tilting uprights, bearing portions formed on said uprights whereby they are also supported on opposite ends of said axle housings, and a torque accepting arm extending from said traction unit and secured to said tilting uprights.

14. In a truck of the class described, a main frame, a combined power and traction unit having an axle housing and traction wheels, bearing portions on said main frame whereby said main frame is supported on opposite ends of said axle housing, a pair of tilting uprights, bearing portions formed on said uprights whereby they are also supported on opposite ends of said axle housing, a torque accepting arm extending from said traction unit and secured to said tilting uprights, and means on said main frame for rotating said uprights relatively thereto about the axis of said axle housing bearing.

15. In a truck of the class described, a main frame, a traction unit having an axle housing and traction wheels supported at opposite ends of said housing, bearings on said main frame whereby it may readily be assembled on said axle housing, while leaving said traction unit free to rotate relatively to said main frame on said bearings, a pair of uprights, means for supporting said uprights on said axle housing, means whereby said uprights accept the driving torque of said traction unit, and power means on said main frame for tilting said uprights and adapted to accept the torque of said traction unit from said uprights.

16. In a truck of the class described, a main frame, a traction unit having an axle housing and traction wheels supported at opposite ends of said housing, bearings on said main frame whereby it may readily be assembled on said axle housing while leaving said traction unit free to rotate relatively to said main frame bearings, a load tilting unit pivotally mounted relatively to said main frame, means whereby said load tilting unit accepts directly the torque of said traction unit, and means whereby said torque is transmitted from said tilting unit to, and accepted by, said main frame.

17. In a truck of the class described, a main frame, a combined power and traction unit having an axle housing and traction wheels, bearing portions on said main frame whereby said main frame is supported on said axle housing, a load tilting unit, means whereby said load tilting unit is supported on said axle housing, a torque arm extending from said traction unit and secured to means carried by said load tilting unit whereby to form a single unit, in effect, of said traction unit and load tilting unit, and means for rotating said single unit in effect on said main frame bearing portions.

18. In a truck of the class described, a main frame, a traction unit having an axle housing and traction wheels supported at opposite ends of said housing, bearings on said main frame whereby it may readily be assembled on said axle housing, a pair of uprights secured to said traction unit axle housing, a torque arm extending from said traction unit and secured to means carried by said uprights whereby to form a single unit, in effect, of said traction unit and uprights, and means for rotating said single unit in effect on said main frame bearings.

19. In a truck of the class described, a main frame, a traction unit having an axle housing and traction wheels supported at opposite ends of said housing, bearings on said main frame whereby it may readily be assembled on said axle housing, a pair of uprights having portions whereby said uprights are also readily secured to said traction unit axle housing, and means whereby the torque of said traction unit about the main frame bearing is accepted by said uprights.

20. In a truck of the class described, a main frame, a traction unit comprising an axle housing and traction wheels supported at opposite ends of said housing, bearings on said main frame whereby it may readily be assembled on said axle housing while allowing rotation of said axle housing relatively thereto, a pair of uprights having portions whereby said uprights are also readily secured to said traction unit axle housing, means whereby the traction torque is accepted by said pair of uprights, and means whereby said torque is transmitted from said uprights to said main frame.

21. In a truck of the class described, a traction unit having an axle housing and traction wheels supported at opposite ends of said housing, a main frame, bearing means whereby said main frame is assembled relatively to said traction unit while leaving said traction unit free to rotate relatively to said main frame, a pair of tilting uprights, bearing means whereby said uprights are assembled relatively to said main frame while leaving said uprights free to rotate relatively to said main frame, torque accepting means between said traction unit and tilting uprights whereby the said uprights accept the traction torque of said traction unit, and means between said main frame and tilting uprights for tilting said uprights and for accepting the said torque from said uprights.

22. In a truck of the class described, a traction unit having an axle housing and traction wheels supported at opposite ends of said housing, a main frame, bearing means whereby said main frame is assembled relatively to said traction unit while leaving said traction unit free to rotate relatively to said main frame, a pair of tilting uprights, bearing means whereby said uprights are assembled relatively to said main frame while leaving said uprights free to rotate relatively to said main frame coaxially with said traction unit, torque accepting means between said traction unit and tilting uprights whereby the said uprights accept the traction torque of said traction unit, and means between said main frame and tilting uprights for tilting said uprights and for accepting the said torque from said uprights.

23. In a truck of the class described, a traction unit having an axle housing and traction wheels mounted at opposite ends of said housing, a main frame, a pair of tilting uprights, means assembling said main frame, said traction unit and said tilting uprights relatively to one another while leaving said traction unit and tilting uprights free for rotation relatively to said main frame, means between said traction unit and tilting uprights whereby the said uprights accept the traction torque tending to rotate said traction unit, and means between said main frame and tilting uprights for tilting said uprights and for accepting the said torque from said uprights.

24. In a truck of the class described, a main frame having a medial portion in the form of an operator's platform, a traction unit, bearings mounting the forward end of said main frame on said traction unit, a pair of uprights also mounted on said traction unit for tilting with said traction unit relatively to said main frame, means between said traction unit and uprights whereby the torque of said traction unit is accepted by said uprights, horizontal extensions secured to said uprights and extending longitudinally of said truck and to the rear of said truck beyond said medial portion, a power unit on said main frame, and means secured to said horizontal extensions of the vertical uprights operated by said main frame power unit for tilting said uprights relatively to said main frame.

25. In a truck of the class described, a main frame having a medial portion in the form of an operator's platform, a traction unit, bearings mounting the forward end of said main frame on said traction unit while allowing rotation of said traction unit relatively to said main frame, a pair of uprights also mounted on said traction unit for tilting with said traction unit relatively to said main main frame, horizontal extensions secured to said uprights and extending longitudinally of said truck and to the rear of said truck beyond said medial portion, a power unit on said main frame, and means whereby said power unit tilts said uprights through said extensions.

26. In a truck of the class described, a main frame, a combined power and traction unit having an axle housing and traction wheels, bearing portions on said main frame whereby said main frame is supported on opposite ends of said axle housing, a pair of tilting uprights, bearing portions formed on said uprights whereby they are also supported on opposite ends of said axle housing, a torque accepting arm extending from said traction unit and secured to said tilting uprights, and means on said main frame for rotating said uprights relatively thereto about the axis of said axle housing bearing, said means accepting the traction unit torque from said uprights.

27. In a truck of the class described, a main frame having a depressed medial portion in the form of an operator's platform, a pair of L shaped members having vertical portions which form uprights for the mounting of a vertically moving platform, means supporting said L shaped members at one end of said main frame for pivoting on an axis passing substantially through the lower ends of said vertical portions, the horizontal portions of the L shaped members extending rearwardly of the truck main frame out of obstructing relation to said operator's platform, and means for tilting said L shaped members through actuation of the said rearwardly extending horizontal portions.

28. In a truck of the class described, a main frame having a medial portion in the form of an operator's platform, a traction unit comprising an axle housing and traction wheels supported at opposite ends of said housing, bearings mounting the forward end of said main frame on said axle housing while allowing rotation of said axle housing relatively thereto, a pair of uprights mounted on said traction unit for tilting with said traction unit relatively to said main frame, horizontal extensions secured to said uprights and extending longitudinally of said truck and to the rear of said truck beyond said medial portion, a power unit on said main frame, and means secured to said horizontal extensions of the vertical uprights operated by said main frame power unit for tilting said uprights relatively to said main frame about the bearing between said main frame and said axle housing.

FRANK A. VOSSENBERG.